(12) United States Patent
Valderrama Chaparro

(10) Patent No.: US 12,471,966 B2
(45) Date of Patent: Nov. 18, 2025

(54) MOULDED PLATES, FASTENED WITH CLAMPS FOR OSTEOSYNTHESIS AND ORTHOSIS, AND MANUFACTURING PROCESS

(71) Applicant: Mario Valderrama Chaparro, Bogota (CO)

(72) Inventor: Mario Valderrama Chaparro, Bogota (CO)

( * ) Notice: Subject to any disclaimer, the term of this patent is extended or adjusted under 35 U.S.C. 154(b) by 574 days.

(21) Appl. No.: 17/758,401

(22) PCT Filed: Jan. 14, 2022

(86) PCT No.: PCT/IB2022/050312
§ 371 (c)(1),
(2) Date: Jul. 5, 2022

(87) PCT Pub. No.: WO2022/180455
PCT Pub. Date: Sep. 1, 2022

(65) Prior Publication Data
US 2023/0157737 A1    May 25, 2023

(30) Foreign Application Priority Data
Feb. 24, 2021    (CO) .......................... NC2021/0002454

(51) Int. Cl.
*A61B 17/80*    (2006.01)
*A61B 17/72*    (2006.01)
*A61B 17/88*    (2006.01)

(52) U.S. Cl.
CPC .............. *A61B 17/80* (2013.01); *A61B 17/72* (2013.01); *A61B 17/88* (2013.01)

(58) Field of Classification Search
CPC .......... A61B 17/80; A61B 17/72; A61B 17/88
See application file for complete search history.

(56) References Cited

U.S. PATENT DOCUMENTS

2004/0087955 A1* 5/2004 Bordi ................. A61B 17/8085
606/74
2005/0010214 A1    1/2005 Tassin
(Continued)

FOREIGN PATENT DOCUMENTS

WO        2019018397 A1    1/2019

*Primary Examiner* — Sameh R Boles
(74) *Attorney, Agent, or Firm* — Patenting Consulting Group; Roberto J Rios

(57) ABSTRACT

The invention is a solution for osteosynthesis made with molded metal sheets joined vertically and horizontally, fitted to the shape and dimensions of the fractured bone to keep it immobile and united. For the orthosis, it depicts metal sheets joined with horizontal and vertical movements, molded to the form and dimensions of vertebrae and joints to keep them separated. The sheet metals have wavy shapes, channels and undulations that give consistency and structural strength to bending, tension, shear and bends for joints. It also describes the process for the osteosynthesis with metal sheets and 3D printing, where the surgeon wraps the osteosynthesis or molded orthosis around the bone, vertebrae or joint, fastening it with clamps that tighten and lock with a surgical instrument, without screws. The sheet metals have viewpoint holes to see through during surgery and subsequent control with Roentgen. The clamps are in channels, which have micro-points on the side contacting the bone.

7 Claims, 9 Drawing Sheets

(56) References Cited

U.S. PATENT DOCUMENTS

2009/0292317 A1 11/2009 Belliard
2019/0059962 A1 2/2019 Lewis et al.

* cited by examiner

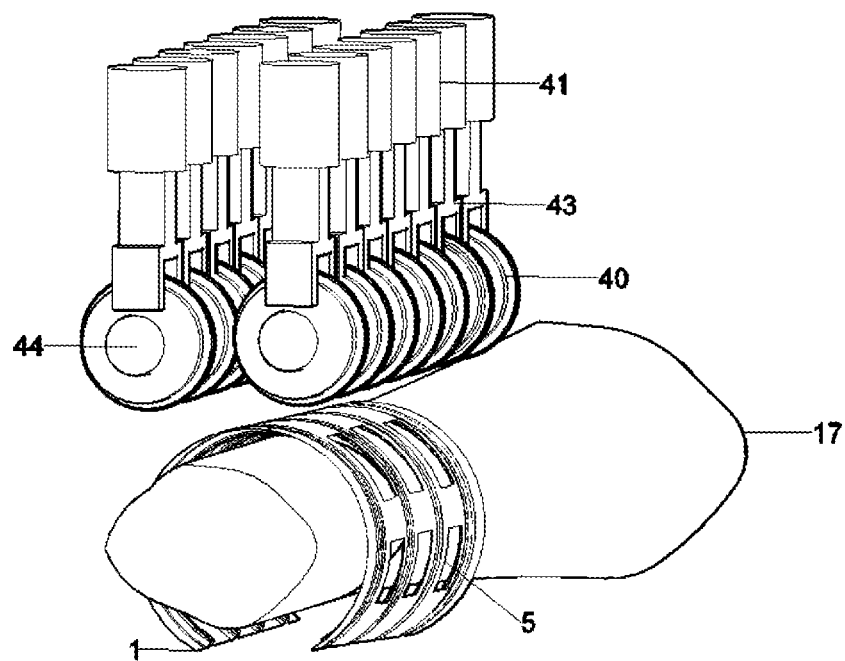
FIG. 13
FIG. 14
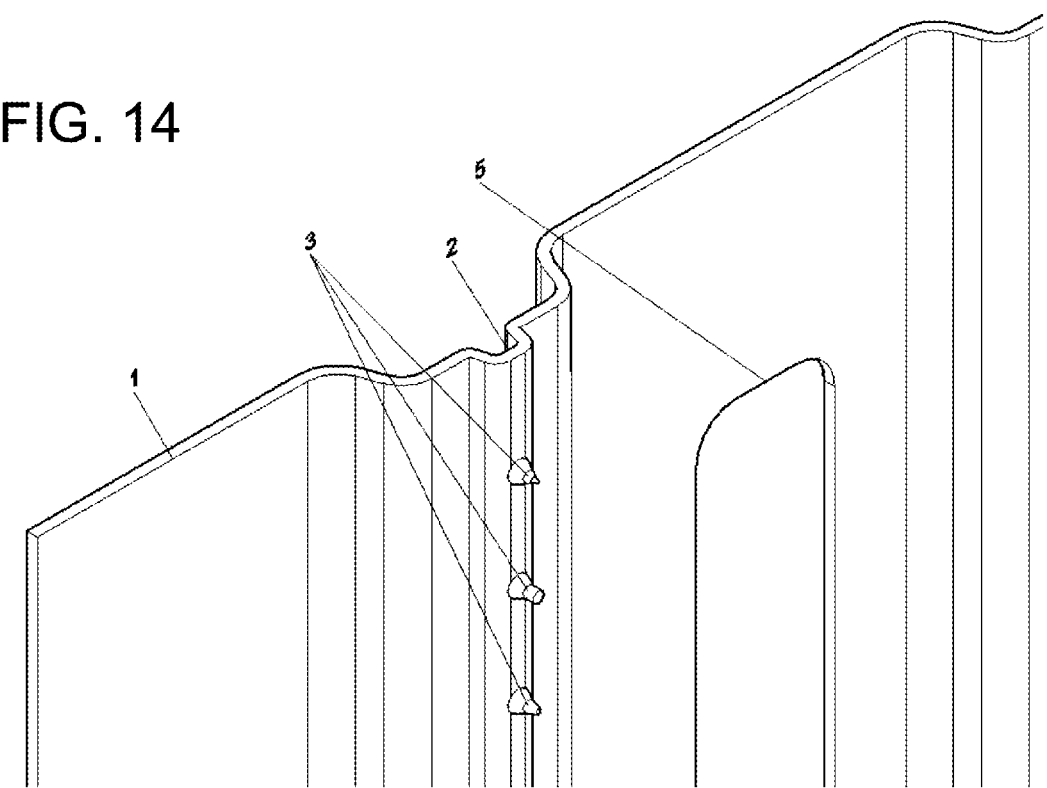

MOULDED PLATES, FASTENED WITH CLAMPS FOR OSTEOSYNTHESIS AND ORTHOSIS, AND MANUFACTURING PROCESS

FIELD OF INVENTION

The field of the invention is medical technology and engineering, specifically osteosynthesis and orthosis. It incorporates medical imaging to create prototypes of the treated bone to mold the plates that form the osteosynthesis or orthosis. It also includes mechanical engineering for the treatment of metal sheets and couplings that have slight horizontal and vertical movements, usable in orthotics and robotics.

STATE OF THE ART

Currently, plates for osteosynthesis are manufactured by casting surgical steel or titanium in which holes are made to secure them with screws to the bone. The holes allow to orient the screws. They are manufactured in various thicknesses, shapes, and sizes for each generic type of bone and fracture. The supplier delivers generic forms according to the type of bone and fracture, with screws and instruments for aligning, drilling, and screwing.

The osteosynthesis and orthotics of the art screws a plate to the side of the bone to hold it in position during healing and treatment. In the operating room, aligners, guides, drills, and screws to fasten a metal plate to the bone. The plates are rigid titanium or stainless steel, generic by type of bone and fracture, with holes for screws. Some have contours and curves to fit the shape of the bone. The plates are 2 to 4 mm thick, widths of the order of 10 to 15 mm and lengths as needed.

In the case of joints and vertebrae where it is required to keep in position and at established distances the parts, plates with screws that restrict the movement of the vertebra or joint are also used.

Several drawbacks are attributed to the plates fastened with screws: they are rigid, they do not adapt to the contour of the bone. The more expensive curved and contoured plates have not shown to be better than the non-contoured ones. They are not an optimal solution because the screws in the bone reduce its structural strength. Surgery requires time to align, drill various holes, and screw down under limiting circumstances and restrictions. They cause discomfort for the patient due to the presence of a rigid plate and screws in their body, static electricity, and tensions. In some cases, it is essential to remove the plate or some screws.

There are a great number of patents on osteosynthesis and orthosis and ways to secure them to the bones. The following ones are examples.

US2019059962 is an osteosynthesis plate fastened with screws that can be tilted to better grip on the bone. It is different from the one proposed in invention because it is a plate fastened with screws.

WO2019018397 recommends adjusting the osteosynthesis plates to the anatomy of the bone and recommends using 3D imaging to adjust the plates to the shape of the bone. It differs from the invention by using plates fastened with screws and that the shape refers to curved plates and not to metal sheets molded on the prototype of the bone.

US2009292317A1 suggests a method for joining vertebrae allowing relative movement between the vertebrae. It includes a flexible tie with two free ends, a spacer between the vertebrae, and a clamping mechanism. It differs from the invention in that in the latter the mooring is done with clamps, it does not introduce a spacer, but it keeps them separate and that the horizontal and vertical movement are obtained by rotation of the union of the metal sheets that form the orthosis.

US2005010214A1 refers to a lumbar spinal osteosynthesis system, which allows angle above vertical. It differs from the invention in that it is not supported by clamps.

WO2018191527A1 refers to biodegradable metal alloys, methods for their preparation and applications for their use in medical devices and implants in patients. They would be suitable for this invention because thin films are more biodegradable than plates.

One technique suggests using plates with fewer bolts, only at the ends, and reinforcing with an eight shape cables to improve tensile strength.

No patents or documents were found that propose osteosynthesis or orthosis based on pre shaped metal sheets, molded, and fastened with clamps as suggested by the invention.

BRIEF DESCRIPTION OF THE INVENTION

The invention proposes a mechanism of sheet metals and clamps for osteosynthesis that maintains the position and joins fractured parts of the bone for repairing and an orthosis modality to maintain vertebrae and joints in position, separated and movable. The proposed osteosynthesis consists of one or several thin metal sheets of the material used in the art, pre shaped, and molded to the dimensions and shape of the fractured bone, which are placed around the bone.

The metal sheets have wavy shapes, channels, and undulations to give consistency and strength to structural bending, torsion, and shear stress. Osteosynthesis and orthosis fastened with clamps, located in the channels formed in the sheet metal, around the bone; They keep the bone-sheet metal assembly fastened and rigid during healing and do not use screws to fasten it.

BRIEF DESCRIPTION OF FIGURES

FIG. 13 shows a view front of the molding machine.

FIG. 14 shows detail of three shapes of micro points.

DETAILED DESCRIPTION OF THE INVENTION

Figure 1:
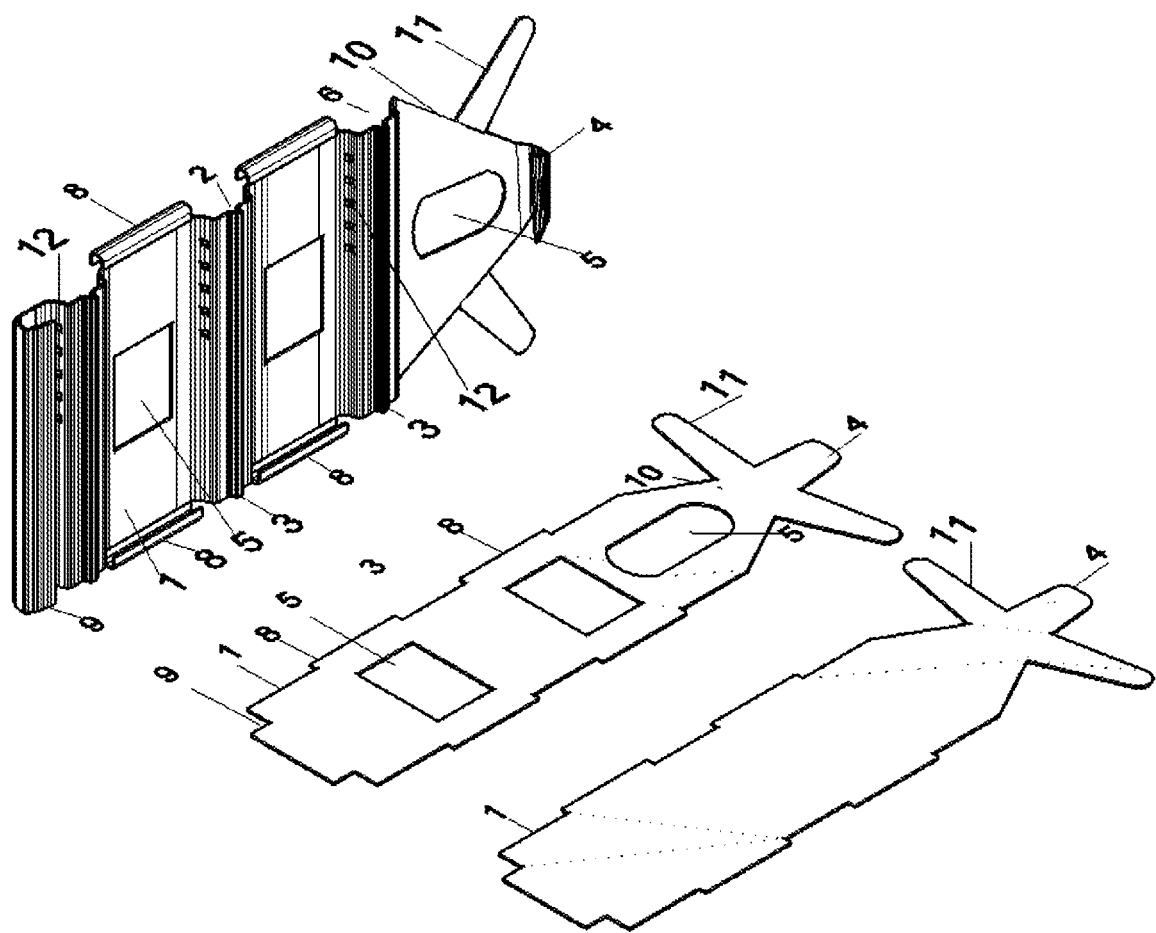
FIG. 1 shows a perspective view of a thin sheet-base (1), with channel (2) for a clamp, micro points (3) that contact the bone, and an extension (10) that allows the osteosynthesis to be extended to nearby small fractures such as malleoli.

The mechanism of sheet metal and coupling with clamps for osteosynthesis of the invention is formed of a flat sheet metal in a single piece or of several joined pieces. The metal sheets are cut to the proper size of the bone to be treated, undulations are made, and several metal sheets are joined, which are molded to the width and length of the fractured bone. The vertical joints are located on the sides of the bone and the horizontal ones around its axis.

The basic osteosynthesis is performed with a flat sheet metal that is molded with the dimensions and traits of the fractured bone, may or may not have projections, and includes clamps and fasteners. The narrow basic osteosynthesis, without joining it to others, is used where its performance is appropriate, there is not channel, or it is not convenient to intervene the interosseous membrane.

The osteosynthesis that is accomplished with the invention is also formed by the union of several basic metal sheets joined vertically to widen it. It includes clamps and their closures.

The structural strength and fastening of the bone parts can be adapted to every condition by varying the gauge of the sheet, its material, position and number of undulations and channels that are made in the sheet, and number of clamps. This form of osteosynthesis allows the use of metal sheets of other materials to those currently in the art. Various other materials that could be used are being considered by those skilled in the art. Depending on the nature of the material, the shaping and molding process depicted below will change and probably it will be easier.

The 3D image and prototype of the bone is made according to the art; there are several ways now applied to obtain three-dimensional images that can be used to printing bone prototypes.

The invention proposes an osteosynthesis to keep fractured parts of the bone in position and place for its repair and an orthosis modality to keep vertebrae and joints in position, separated and mobile, consisting of:

1. One or several thin metal sheets of the material used in the art for osteosynthesis, joined in flexible form, pre shaped, and molded to the dimensions and shape of the fractured bone, which are arranged around it. They can be thicker metal sheets. It can also be only one metal sheet.
2. The metal sheets have undulations, channels, and low undulations to give consistency and strength to structural bending, torsion, and shear stress. The channels have micro points on their internal side, where the osteosynthesis or orthosis contacts the bone. Altogether, the height of the sheet metals and clamp is about 2 to 3.5 mm, similar to osteosynthesis in the art.
3. Clamps to fasten the osteosynthesis and orthosis, located in channels made in the sheet metal, around the bone, keeping the bone-sheet metal joint fastened and rigid during healing.
4. The sheet metals have viewpoints to look at the position of the pieces of the fractured bone during surgery and later for X-ray controls.
5. Prior to surgery, the sheet metal is shaped and molded on a generic prototype of the fractured bone or on the patient's one, printed in 3D from a digital image. On this prototype the sheet metal is rounded and molded to the shape, dimensions, and surface variations of the patient's bone. Osteosynthesis and orthosis must be exactly adjusted to the shape of the treated bone. Clamps and stress components are calibrated to be used in the specific case, for exact fit and optimal structural performance. Structural performance can be measured theoretically in a computer, compare it with recommended requirements, simulate options, and introduce changes in shaping and molding until obtaining the osteosynthesis or shaped and molded orthosis with optimal performance for each case. Specialized personnel make these adjustments, in accordance with the instructions and requirements given by the specialist.
6. The surgeon sets the molded osteosynthesis around the fractured bone, vertebrae or joints, tightens and locks clamps, using a special instrument or one in the art. It does not use screws to fasten it to the bone.
7. Once the osteosynthesis is fastened with a clamp to one end of the fracture, the other end is calibrated to improve longitudinal approach and alignment of the fractured portions, a clamp will tighten and lock on the other end. All clamps will be fastened, repeating tension and closure for all of them.
8. The instrument for tensioning and locking the clamps has protrusions to penetrate the holes at the ends of the clamp, tighten and lock. It has an indicator for the tension applied.
9. Another modality is a molded orthosis that keeps the vertebrae and joints in position and spaced. This orthosis allows slight horizontal and vertical movements. Each part of the molded orthosis is fastened onto the bones by placing the horizontal joint between vertebrae or joint. These joints keep vertebrae at a distance and allow horizontal movement. The joints can have micro bearings, also useful in robotics and mechatronics.
10. The process to attain the osteosynthesis and the molded orthosis with a exact fit to the fractured bone, vertebrae or joint, which is delivered to the surgeon, is as follows:
    a. It begins with a digital image of the fractured bone, vertebrae or joint, as is it currently done.

b. The image is evaluated in a computer-aided imaging system by a specialist physician and assistant technician to determine what is required to mending.

c. Fractured bone is simulated to a healthy bone. Specialist and technician evaluate forces and tensions to reach to a healthy bone and determine the guidelines to create and mold the osteosynthesis or orthosis to be fastened by the surgeon. This simulation will be done with an algorithm that draws as a model a healthy bone from the bone database.

d. The healthy bone is made, and the pre shaped sheet metal is molded on it, with the equipment and process depicted in the production process. There will be osteosynthesis and orthosis for each type of long bone, vertebra and joint that is required according to age, gender, ethnicity and type of fracture or case to be remedied. The art has databases and engineering of human and animal bones. These databases will boost if they prove being of practical use.

Depending on the database, it may be sufficient to use a generic prototype without the 3D printing of the patient's fractured bone, vertebrae or joint.

e. If production of generic osteosynthesis and orthosis is to be distributed, once the molding is finished, it will be sterilized and placed in sterilized packaging.

f. In the case of osteosynthesis and generic orthosis, the process includes adjustments to the sheet metal and orthosis before the operating room, if necessary.

Material cutting, pre shaping, molding and adjustment processes can be manual, mechanized, or automated robotically with Artificial Intelligence based on specific images or databases and algorithms.

The following figures show how the parts of the sheet metal, and the orthosis are composed, manufactured and function; they are illustrative of the invention and not limited thereto.

Figure 7:
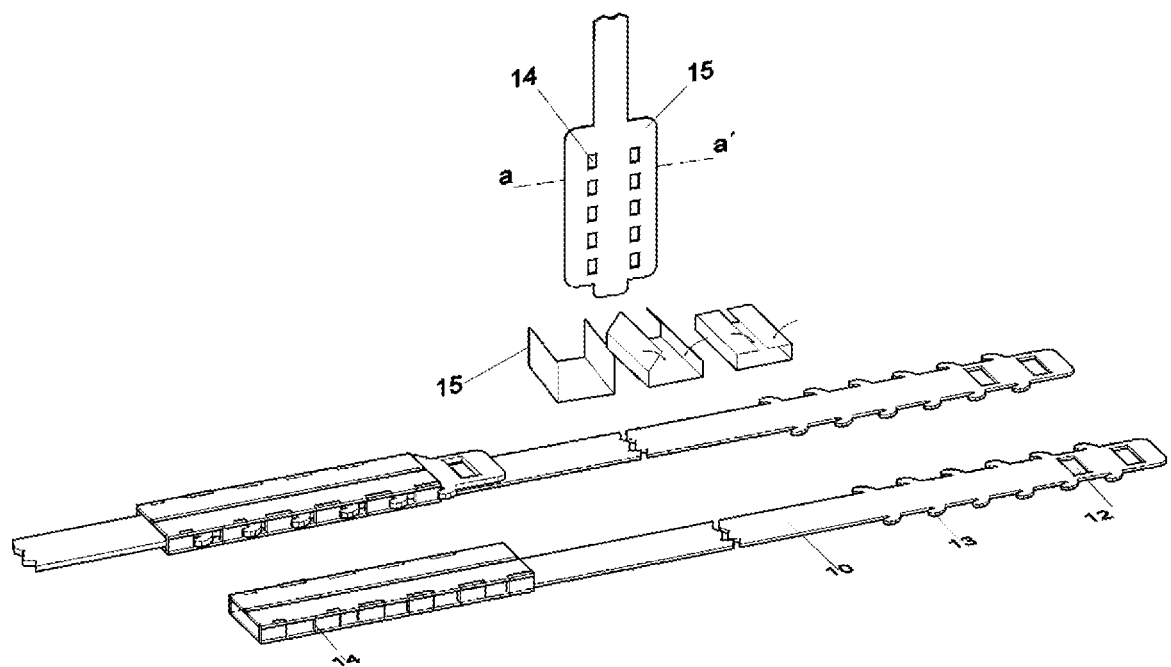
FIG. 7 shows a perspective view of another clamp to fasten the osteosynthesis to the bone, vertebra or joint, which is inserted into the channel (2) of the osteosynthesis.

FIG. 1 shows a perspective view of a thin sheet-base (1), with channel for a channel (2), micro points (3) that contact the bone, the extension (10) that allow prolonging osteosynthesis to nearby small fractures such as malleoli, and its termination (4) to fasten the fracture, as well as extension grips (11) to fasten around the bone. Four extension grips (11) have been drawn but each case will determine how many are needed. It shows viewpoint holes (5) in the sheet metal, viewpoint hole during surgery and in the control images, as well as the vertical coupling joints (8) and the horizontal coupling joints (9) that join several thin sheet-base (1) to give the shape of the area to be covered. The folding of these joints does not exceed the height of the osteosynthesis, although they have been exaggerated in the figure to highlight them. It shows the channels (6) where the clamps (7) and holding holes (12) for the fastening are located, which are depicted in FIG. 7.

Figure 2:
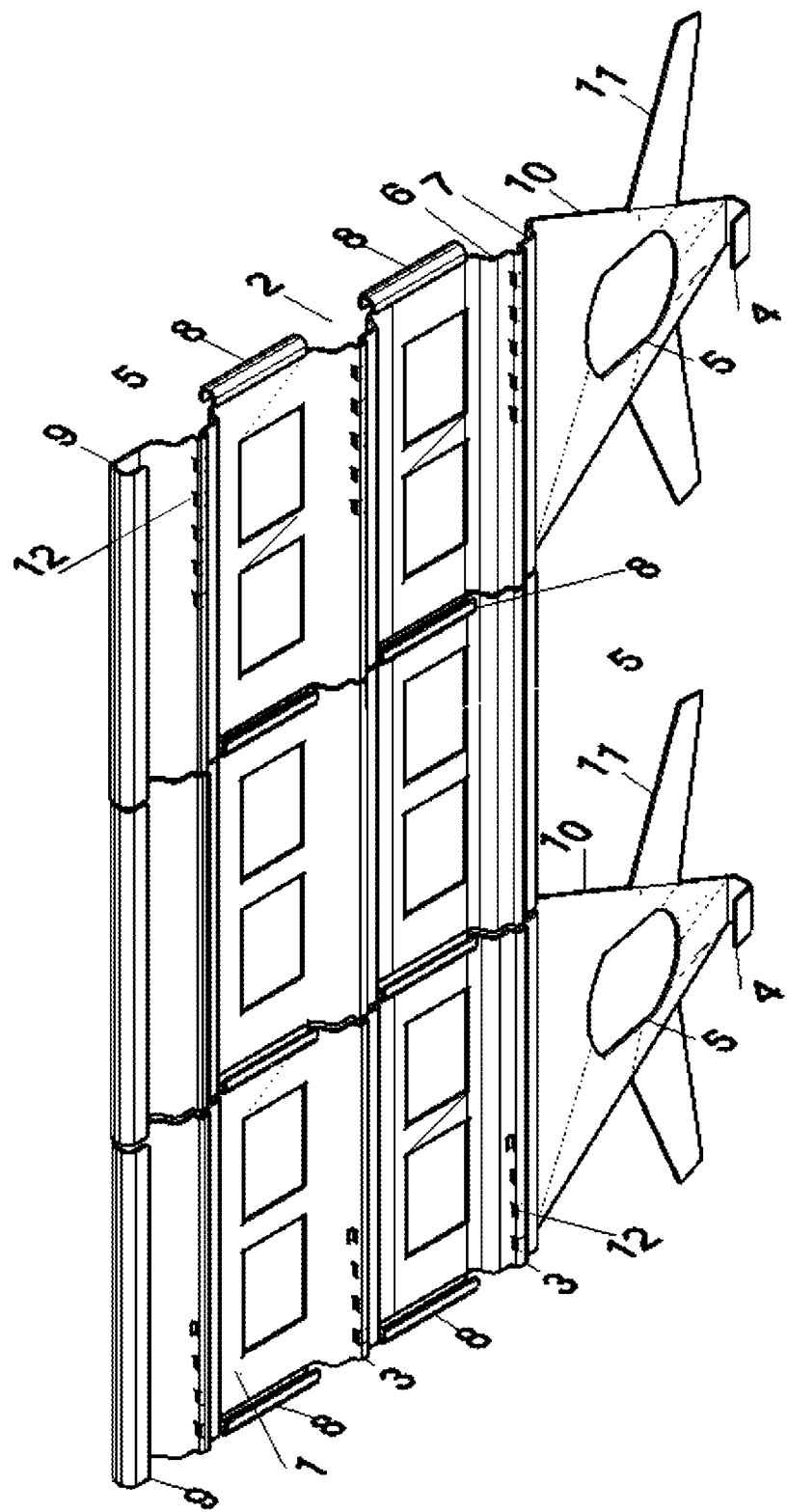
FIG. 2 shows a perspective view of three flat basic sheet metals joined to form the osteosynthesis with channel (2) for a clamp.

FIG. 2 shows a perspective view of the union of three thin sheet-base (1) joined to form an osteosynthesis with channel (2) for a clamp, micro points (3) that contact the bone, the extension (10) that allows the osteosynthesis to be extended to nearby small fractures such as malleoli, and its termination (4) to fasten this fracture, viewpoint holes (5) in the thin sheet-base (1), to look at during surgery and in the control images. It shows the channels (6) where the clamps (7) depicted in FIG. 7 are located. It shows two extensions (10) to secure small fractures adjacent to the main one, each with two lateral extension grips (11) to secure to the bone. The number and shape of the extensions (10) and of the lateral extension grips (11) are fitted to the type of bone and fracture. This shape also allows osteosynthesis to be used on small fractures, using a clamp and these extensions.

The osteosynthesis can be composed of the number of metal sheets-base, size and shapes that are required. The number depends on the area that needs to be covered, the shape of the cutting and the number of extensions according to the dimensions of the bone and the location, type, and size of the fracture. The information to determine the above parameters is obtained from a digital image of the fractured bone. According to what the physician in charge indicates, the metal sheets are cut, pre shaped, and then molded to constitute the osteosynthesis that will be wrapped around the patient's bone and fastened with clamps.

Figure 3:
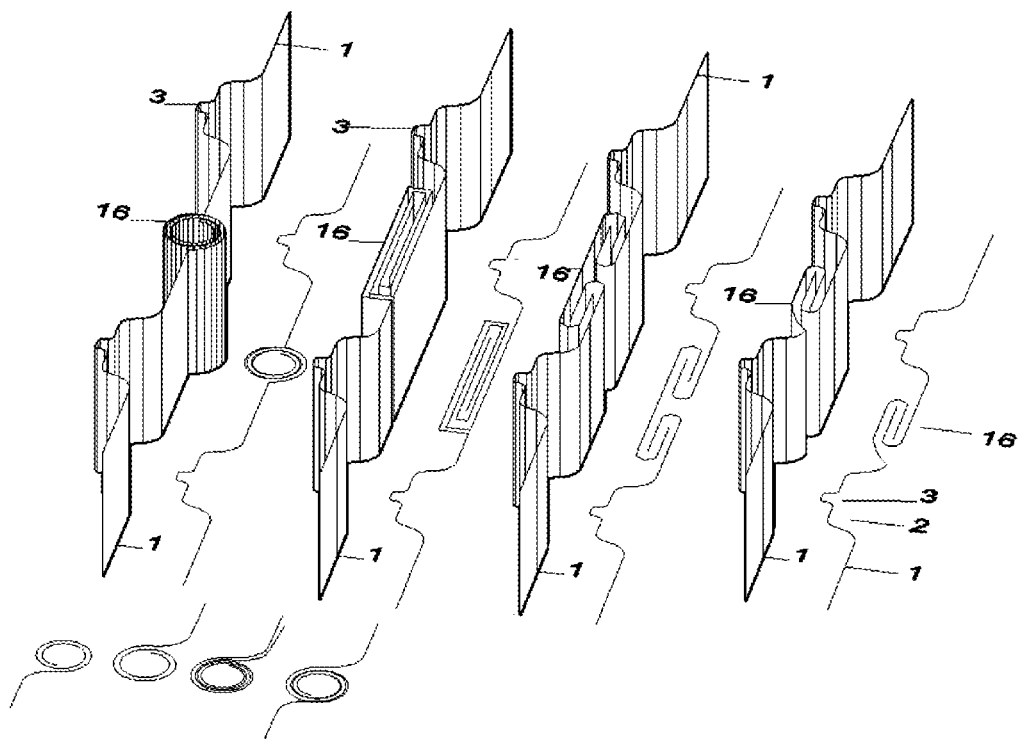
FIG. 3 shows a perspective and top view of several examples of vertical joints (16) for couple sections of thin sheet-base (1) and expand the area to be covered that requires the fracture. Shows channel (2) for clamp, micro contact point (3).

FIG. 3 shows a perspective and top view of various examples of vertical joints (16) to couple sections of thin sheet-base (1) and expand the area to be covered that requires the fracture. Shows channel (2) for clamp, micro contact point (3). For better illustration, the size of the vertical joints (16) is exaggerated. Its height is 3 to 3.5 millimeters, not greater than that of the channel (2). The base-metal sheets are unified by sliding them laterally and will be flattened in the formation.

These vertical joints allow lateral extension and molding of the sheet metal to the required dimension for long bone fractures, keeping the sheet metals together, making the assembly more flexible and reinforcing the structural strength of the sheet metal to shears, torsion and longitudinal.

Figure 4:
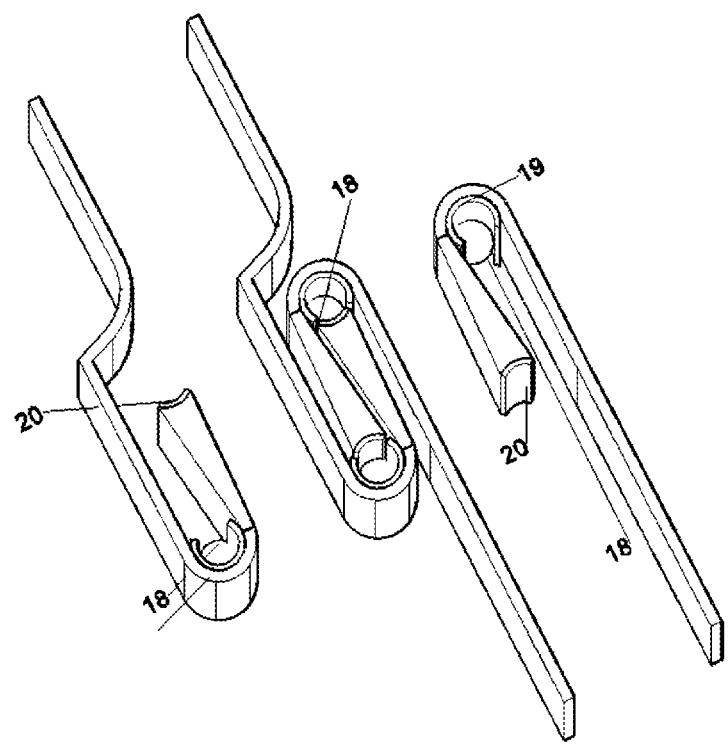
FIG. 4 shows a perspective view of a horizontal joint that is formed by two sections that are coupled by sliding them together. Each of these joints is fastened to the sheet metal that forms the osteosynthesis.

FIG. 4 shows a perspective view of a horizontal joint (17) created by two sections that are coupled by sliding them into. Each of these joints is fastened to the sheet metal that creates the orthosis. As in the previous ones, the sheet is cut to size, folds are made in the sheet to create joints. The joints have micro bearings (18) housed in a horizontal joint (19) where they move, these are made with materials that reduce friction. They also have a liner (20) to keep the bearing in position.

Since the joints are inserted by sliding into the two parts and due to the geometry of its structure, it cushions impacts, makes stretching more flexible and prevents the two parts from touching each other. This union that keeps vertical separation and allows rotations and inclinations, and with bearings in the union and shock absorbers, can be used in extensions of machines and robotic arms. The inner part of the horizontal joint (19) where the bearings (18) are accommodated can have stops on the inner part, not shown, to regulate the rotation at controlled distances, useful in robotics and machines, to regulate movements.

Figure 5:
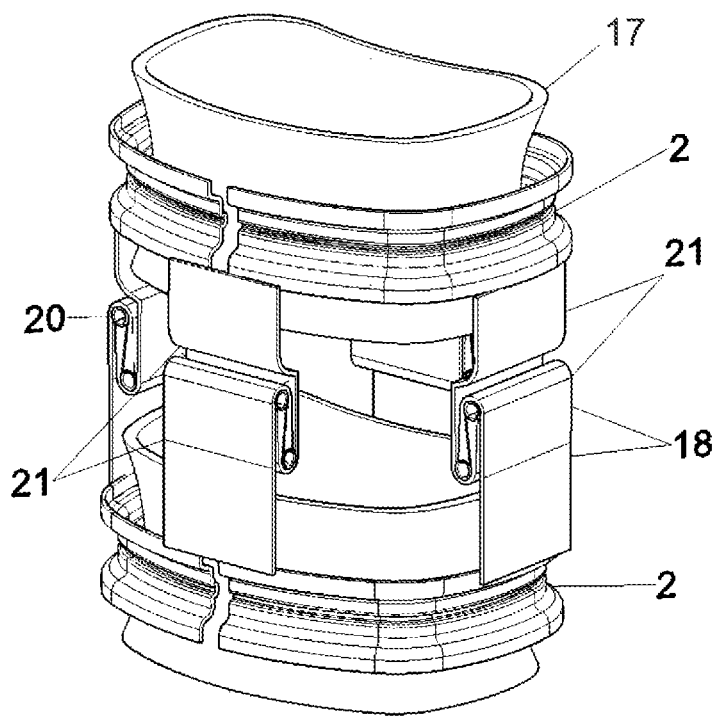
FIG. 5 shows a front view of the other modality of metal sheets molded and fastened with clamps to keep vertebrae and joints apart. The joints prevent vertical displacement and allow slight rotations and tilting of the osteosynthesis.

FIG. 5 shows a perspective view of an orthosis, in another modality of molded metal sheets fastened with clamps, to keep separate vertebrae and joints. The orthosis is a body made up of joints and sections where clamps are placed. The assembled support joints prevent vertical displacement and allow slight rotations and inclinations of the orthosis. It shows channel (2) for clamp, and as a lower quarter of the body of the vertebra (17), where the clamp is fastened. The joints are placed in numbers that give structural strength and allow visualization during surgery and on control images. The width of the assembled support links (21) will determine the length of the horizontal displacement. The vertical tilt can be suitable for different degrees.

Horizontal joints are part of the vertebrae and joint orthosis, they keep the clamped parts steady and separated. The molded orthosis is fastened with clamps on two or more vertebrae, the union is positioned between the vertebrae, at a set distance, preventing them to contacting vertically and allowing for rotation and inclination movements.

Since the section cuts at 90° in the vertical axis of vertebrae, joints and bones are not perfect circumferences, and because it is necessary to have viewpoint holes for the bones, the horizontal joints with or without bearings (18) do not cover the entire periphery of the vertebra, several support links (21) are located on the periphery sufficient to provide structural strength, allowing for viewpoint holes (5) and freedom of movement. How many joints and their location are decided by the specialist.

The manufacturing procedure for this orthosis is the same as for the osteosynthesis. It begins with the cutting and shaping of the metal sheets with the extensions that are the base to form the support joints 9 (FIG. 4) that are slid in to form the set. According to the evaluation, it can be one or several metal sheets that form the set, joined vertically, as shown in FIG. 3.

Figure 6:
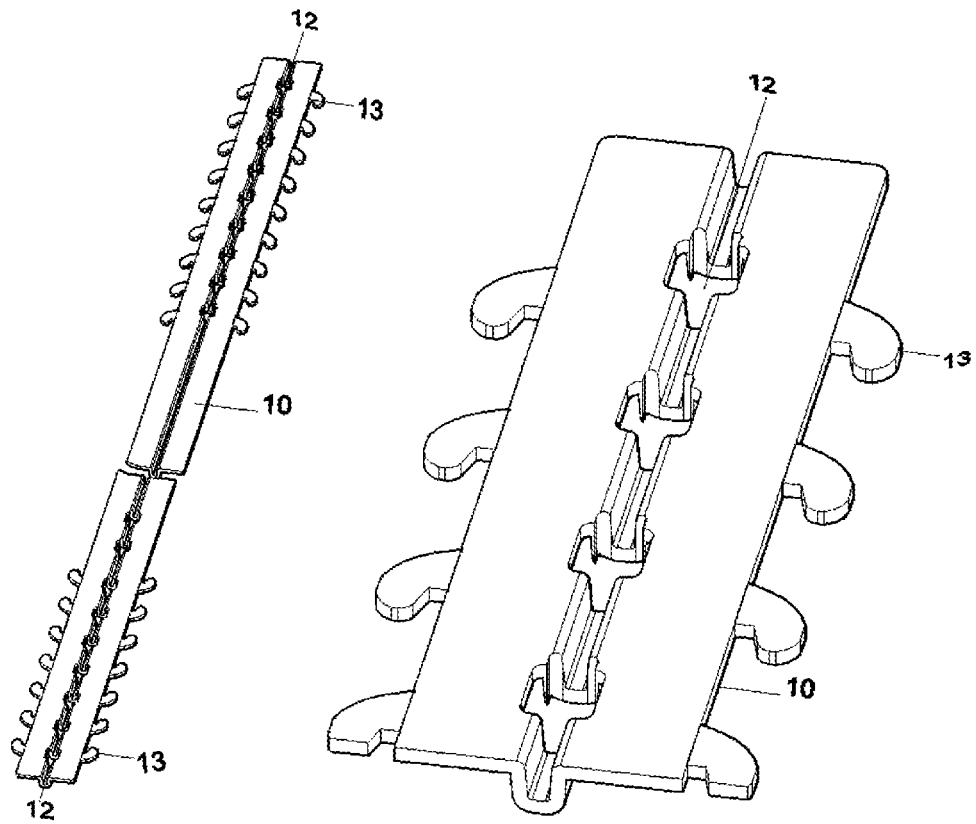
FIG. 6 shows a perspective view of a clamp to fasten the sheet metal for osteosynthesis to the bone, vertebra or joint, which it is positioned into the osteosynthesis channel (2). Shows an enlarged portion of the clamp.
Figure 8:
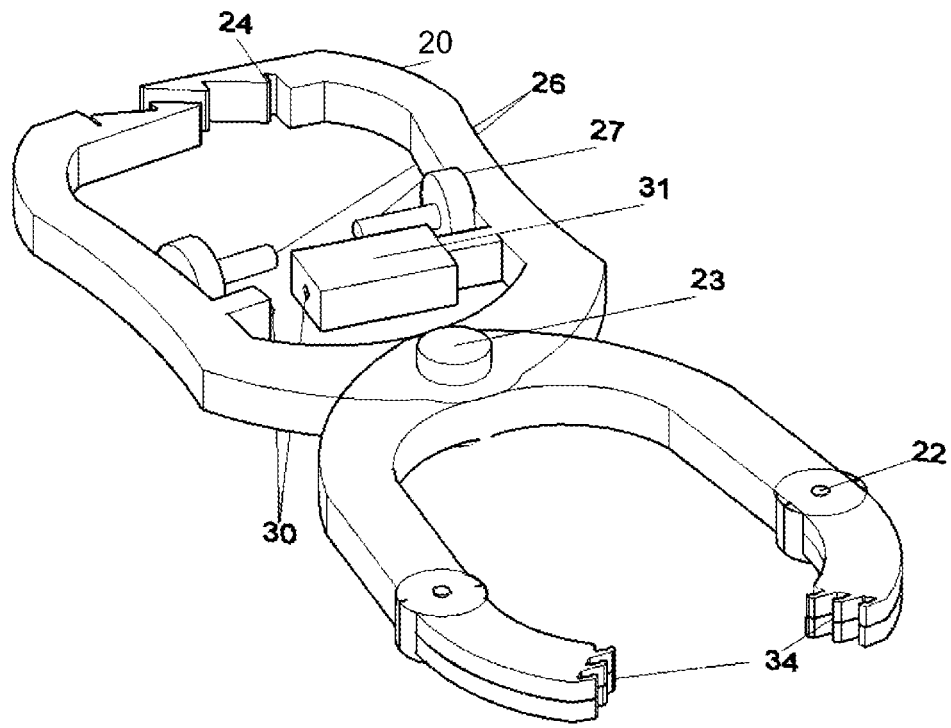
FIG. 8 shows a perspective view of an example of an instrument to tighten and lock clamps to fasten the osteosynthesis or molded orthosis to the fractured bone and vertebrae.

FIG. 6 shows a perspective view of a clamp to fasten the osteosynthesis to the bone or orthosis onto the vertebra or joint, which is inserted into the channel (2) of the sheet metal, shown in FIG. 1, tightened and locked around it with surgical instrument that is shown in FIG. 8. It shows the sheet metal that forms the body of the extension (10), the holding holes (12) where the gripping projections (34) of the surgical instrument depicted in FIG. 8 are inserted. It also shows the gripping projections (34), which are inserted into the locking holes (14) of the sheet metal shown in FIG. 1.

The clamp has the same shape as the channel created in the basic sheet metal, with dimensions slightly smaller than those of the channel (2) of the sheet metal so that it precisely engages in it which, when tightened, fastens the osteosynthesis or orthosis to the bone The clamps are about 3 mm high, attached to the osteosynthesis around the bone, they are tightened and locked by pressure by the surgeon with an surgical instrument like the one in FIG. 8.

FIG. 7 shows a perspective view of another type of clamp to fasten the osteosynthesis to the bone, vertebra or joint, which is inserted into the channel (2) of the sheet metal. It has the same traits as the previous one, with a different closure system, made up of perforated metal sheets in the same sheet that are then folded to form the closure, which is shown enlarged.

It shows the locking of the flat sheet (15) with folds and locking holes (14). Cut to shape and dimensions, these parts are molded to create the channel where the other end of the clamp penetrates so that the gripping projections (13) engage in the locking holes (14). The pleated parts are hard-pressed to complete the closure.

There are many alternatives for the clamps, including cables that fit into the channel (2) of the osteosynthesis sheet metal. They can have different forms of closures, not shown. In FIG. 7 the holding holes (12) can be drilled in the base of the channel (2) where the grips built into the base of the clamp insert into them and lock. This locking mode is not shown.

FIG. 8 shows the perspective view of an example of an instrument for tightening and locking clamps to fasten the osteosynthesis or molded orthosis to the fractured bone. This instrument has handles (20) that support a lever on a rotating axis (23), gripping projections (34) that insert into the holding holes (12) located at one end of the clamp and at the other end in the locking holes (14) shown in (FIG. 3), where they pierce to tighten the clamp. The gripping projections (34) have a rotating union (22) to ease inserting them in the locking holes.

It shows tension sensors (30) with numerical indicator (31) to measure the tension applied on the clamp. It has safety stops (26) to avoid excessive tension, which are adjusted by turning a wheel (27) in a worm screw. Shows ratchets (24) of handles as it is usual in surgical instruments. The instrument can be made with the means that exist in the art, to operate it manually or with a motor, gears, and commands, controlled through a screen that commands and displays tension values. The tension indicator can be digital or analog and it must be secured in such a way that it can be removed when the tensioning instrument is cleaned and sterilized.

Figure 9:
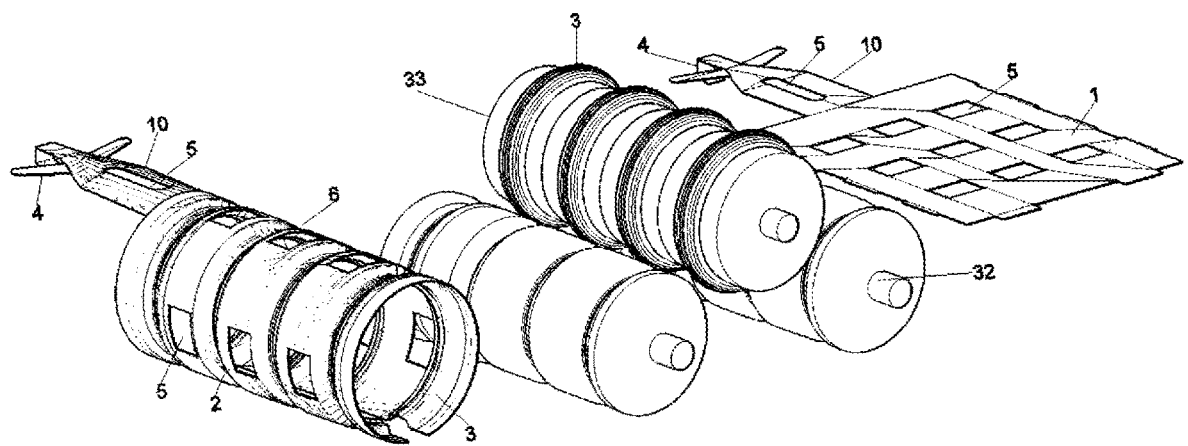
FIG. 9 shows perspective view of an osteosynthesis sheet metal machine and osteosynthesis pre shaped.

FIG. 9 shows a perspective view of a machine to shape the sheet metal for the osteosynthesis and the pre shaped sheet metal, with the thin sheet-base (1) cut and holed for the bone to be treated, which has viewpoint holes (5) and an extension (10) to fasten surrounding small fractures, the plates and ways to secure the termination (4). The sheet shaping machine is a sheet rolling machine made up of three cylinders, the two lower cylinders (32) that have the channel (2) engraved in low relief for the clamp and the traits already depicted. The relief where micro points (3) of contact with the bone are created. The upper cylinder (33) has the same traits engraved in high relief. The flat sheet passes between these 20 cylinders and by pressure they print the channels and traits on the sheet, which comes out rolled in a curved shape and with dimensions and number of extensions (10) and terminations (4) as required. This pre shaped osteosynthesis will be molded as indicated in the following figures.

Figure 10:
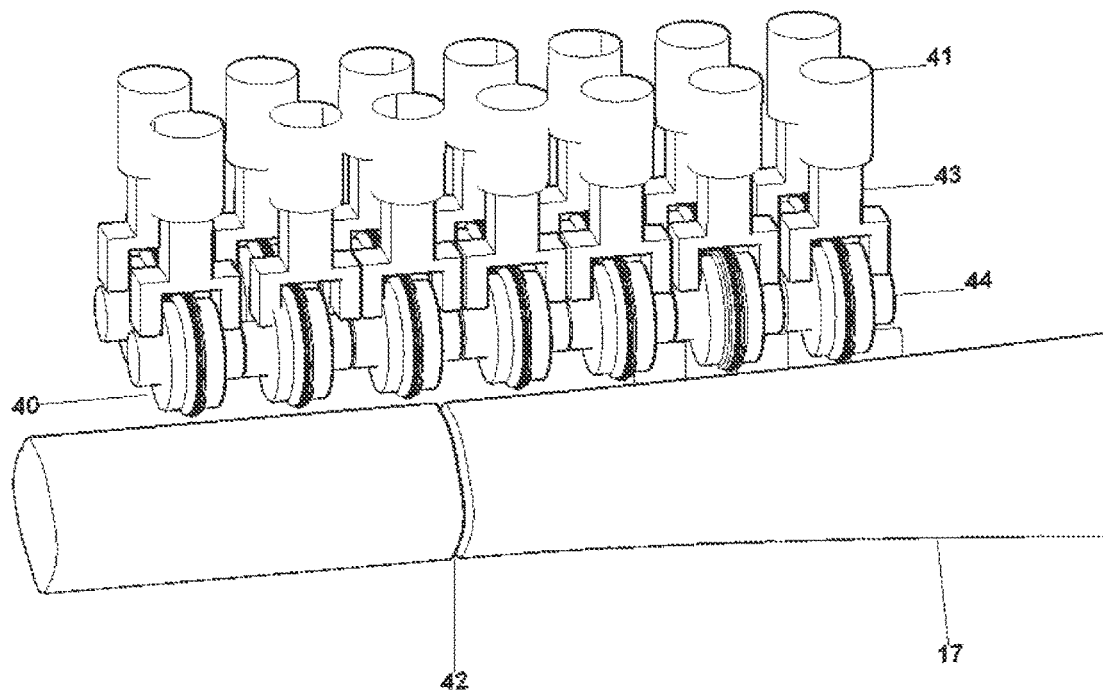
FIG. 10 shows a perspective view of the mechanism of the molding machine for osteosynthesis on a fractured bone.

FIG. 10. Shows perspective view of the molding machine of the sheet metal on a fractured bone (17), composed of pressing wheels (40) to mold the previously formed sheet metals by pressing them against the fractured bone (17), printing the contour, undulations, and differences of the fractured bone surface. Shows pressing cylinders (41) that create pressure on the front wheels by hydraulics or springs, the wheel supports (43) and connection with the pressure cylinders, the axle (44) supporting the wheels, and the fracture (42).

Since the section cuts at 90° to the vertical axis of bones, vertebrae and joints are not perfect circumferences and their surfaces are not smooth, it is necessary to use pressers to force the pre shaped sheet to take the shape, contours, and surface variations of the bone.

The more clamps used, the more closely the sheet metal will approximate the actual shape of the bone. They are very small pressers, with power supplied by hydraulic cylinders or springs.

The illustration does not include support structures for the hydraulic cylinders, gears, hydraulic pump and other components of the molding machine because there are many ways in the art to make them.

It is a small machine about 30 cm wide, about 25 cm high and about 20 cm wide, including base, supports, bone fixators, gears, shafts, guides, and other necessary elements. The axis that supports the cylinders will allow them to be moved longitudinally to adjust them to the pre shaped sheet.

Figure 11:
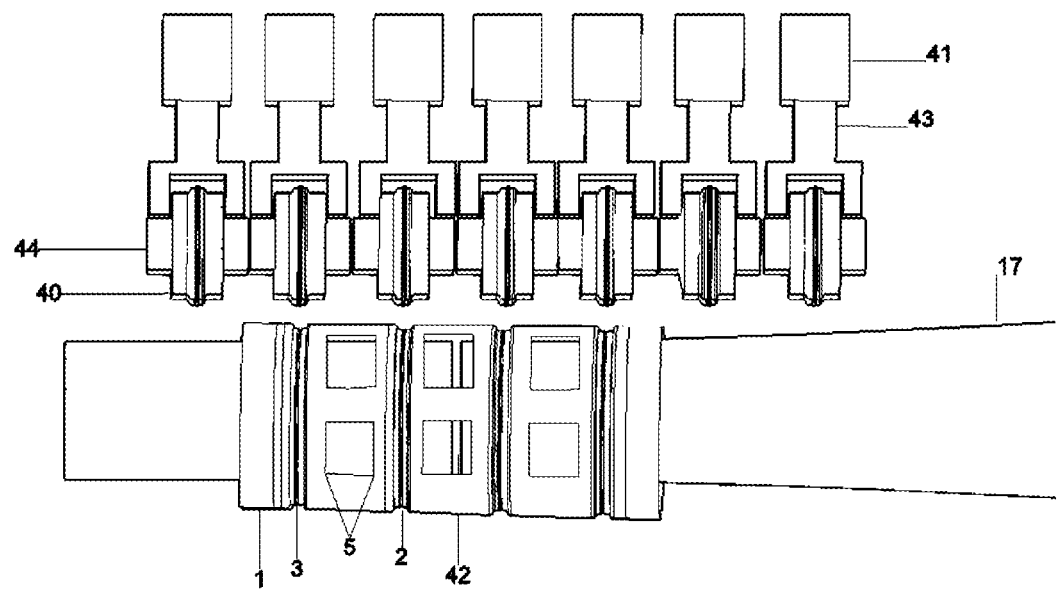
FIG. 11 shows a front view of the sheet metal molding machine, made up of pressing wheels (40) to mold the previously formed sheet metals by pressing them against the prototype of the fractured bone (17), imprinting the contour, undulations, and surface differences on the sheet metal for the fractured bone.

FIG. 11 shows a view from the front of the molding machine composed of pressing wheels (40) to mold the previously formed metal sheets by pressing them against the fractured bone (17) printing the contour, undulations, and surface differences of the fractured bone. It shows hydraulic pressing cylinders (41) that press on the front wheels, the wheel supports (43) and connection with the pressure cylinders, the wheel axel (44), and the fracture (42). It also shows the traits of the thin sheet-base (1), the channel (2) where the clamp will be housed, the contact micro points (3) and the viewpoint hole (5).

Figure 12:
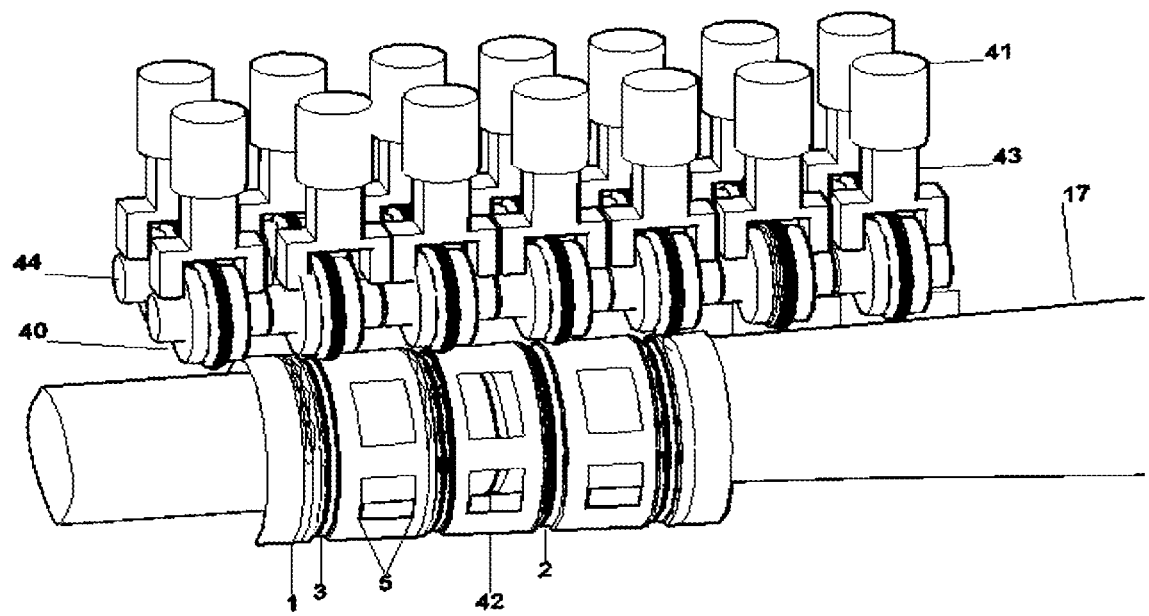
FIG. 12 shows a perspective view of the machine and its pressing wheels.

FIG. 12 shows a perspective view of the molding machine composed of pressing wheels (40) to mold the previously formed metal sheets by pressing them against the fractured bone (17) printing the contour, undulations, and differences in the surface of the fractured bone. Shows hydraulic pressing cylinders (41) that create pressure on the front wheels by hydraulics or springs, the wheel supports (43) and connection with the pressure cylinders, the axle (44) supporting the wheels, and the fracture (42). It also shows the traits of the thin sheet-base (1), the channel (2) where the clamp will be housed, the contact micro points (3) and the viewpoint hole (5). creases FIG. 13 shows a perspective view of the molding machine composed of pressing wheels (40) to mold the previously formed metal sheets by pressing them against the fractured bone (17). Shows pressing cylinders (41) that create pressure on the front wheels, the wheel supports (43), and the pressure cylinders, the axle (44) that supports the wheels.

FIG. 14 shows a detail of three forms of micro points (3) of contact with the bone, arranged at convenient distances. These micro points are made with strikes in the production process. It also shows the thin sheet-base (1), channel for a channel (2), viewpoint hole (5), to see through during surgery and in control images. Micro-punctures can also be made in the surface of the sheet, not shown.

Figure 15:
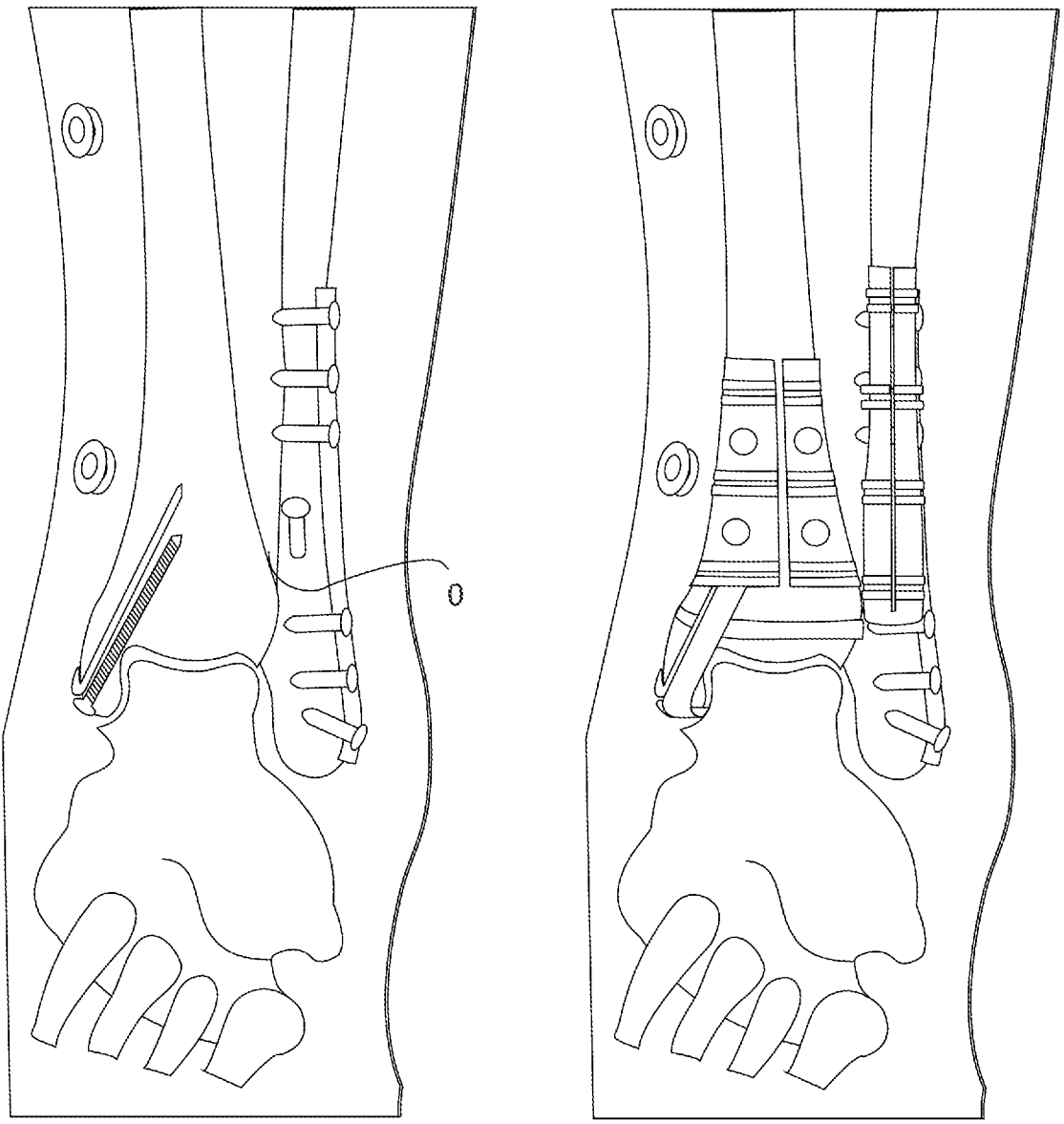
FIG. 15 shows a Roentgen image of a fracture of the fibula and tibia treated with plate osteosynthesis and screws. The same image shows the fracture treated with the osteosynthesis of the invention, without screws.

FIG. 15 shows a Roentgen image of a fracture of the fibula and tibia healed with plate osteosynthesis and screws. The same image shows the fracture healed with the osteosynthesis of the invention, without screws. Clamps are not included in the picture. Two forms of osteosynthesis of the invention are illustrated. The one on the fibula is fastened with sheet metal clamps, as illustrated, and the one on the tibia with wire clamps.

It can be observed that minute fractures (0) of the bone are not integrated into the healing with plate and screws. It can also be seen that the approach of the fractures is not completed, nor is the alignment.

If the osteosynthesis of the invention was applied, these minute (0) fractures could be integrated into the bone, with the sheet metal, and the approach and alignment could be improved.

Production and Molding of Sheet Metals for Osteosynthesis

The production and molding are illustrated for metal sheets of surgical stainless steel or titanium or other one used for osteosynthesis, and for long bone fracture, consisting of:

Step 0. Factory supplies sheet metal with specifications, thicknesses 0.38 to 0.30 mm.

Step 1. Cut the metal sheets with a water jet or laser according to the design and dimensions for each type of bone and fracture.

Step 2. Create holes in the sheet of designed shape and size with laser or water jet cutting. This cut can be made simultaneously in Step 1.

Step 3. Pre shape the metal sheets with sheet roller machine on whose surfaces are engraved undulations, channels, contact micro points and any other design. The sheet roller machines in all its length can have the same or different radii to imitate the shape of the bone.

This step creates curved metal sheets with undulations, channels, micro points, according to design and size for each type of bone and fracture, it is only the osteosynthesis pre shape, since at each point of contact is a circumference with radii equal to those of the cylinders of the rolling machine, which do not copy the undulations of the shape and surface of the bone.

Step 4. Create horizontal and vertical bends to join two or more metal sheets.

Step 5. Mold the osteosynthesis by pressing the pre shaped metal sheet on the 3D prototype of the patient's bone using hydraulic or mechanical pressure wheels, on the sheet located along and around the bone prototype. Osteosynthesis has the same shape of undulations, channels, of the pre shaped sheet metal. The pressure wheels move from the top to the bottom forcing the sheet metal to copy the contour and undulations of the bone prototype. The support of the pressing wheels can be moved longitudinally to adjust them to the pre shaped sheet located on the bone. This displacement can be manual or electronic and AI.

As it moves and presses around the sheet metal on the bone, each pressure wheel copies the contours and irregularities of the surface it presses on, so the narrower the rotating tip and the more pressure wheels used, the more accurate will be the molded shape. This step creates the final shape of the osteosynthesis. In both cases, in shaping and molding, it is possible to use heat to facilitate the process, especially if plastic materials or metallic metal sheets are used.

Step 6. Mold clamps on the channels and contour, their length and class of closure, with the same rollers of the sheet roller machine applied to pre shape the metal sheets. This step produces curved clamps to be attached by the surgeon to fasten the osteosynthesis to the bone.

Step 7. Sterilize molded osteosyntheses and brackets by autoclaving at temperatures and times used for surgical instruments.

Step 8. Place the final osteosynthesis in sterile packaging, seal, and pack.

Step 9. Deliver to surgeon or send to destination.

Step 10. To form the clamp, cut the metal sheets with a water jet or laser according to the design and dimensions for each type of bone and fracture.

Step 11. Create holes in the sheet of designed shape and size with laser or water jet cutting. This cut can be made simultaneously in Step 10.

Step 12. Create horizontal and vertical bends to join two or more metal sheets.

Step 13. Image for 3D printing of the fractured bone to be repaired.

Step 14. 3D impression of how the parts of the healthy bone should look like, now separated. Algorithm to automate the alignment of the fractured bone, not included in the invention.

Step 15. Pre-adjust the osteosynthesis and the clamps to the 3D bone model.

The invention claimed is:

1. Molded sheets, fastened with clamps for osteosynthesis and orthosis that hold fractured bones immovable and unified, wherein each one of the molded sheets comprising: a thin sheet-base, wherein the molded sheets are joined together with vertical coupling joints and the horizontal coupling joints in a flexible way, and are molded to a shape and dimensions of a fractured bone, and are configured to be fastened to the fractured bone with tensile clamps; wherein the molded sheets have undulations, bas-reliefs, channels with micro points of contact, viewpoint holes and have extensions for adjacent fractures adjacent to a main fracture, wherein the molded sheets can be molded to a shape of a fractured bone prototype of a patient, or molded to a shape of a generic bone, and configured to be that are fastened with a surgical instrument.

2. The molded sheets according to claim 1, wherein said channels (2) consist of a ribbon with holding holes (12) at one end to tighten at other end which has locking holes (14)

where gripping projections (13) are inserted, coupled in the channels (2) around the osteosynthesis for fastening to the fractured bone.

3. The molded sheets according to claim 1, comprising at least one thin sheet-base (1) joined with horizontal joints (17) and vertical joints (16), pre shaped and accurately molded to a contour of vertebrae and joints, fastened with tensioning clamps.

4. The molded sheets according to 3, wherein the horizontal joints (17) of thin sheet-base (1) have micro bearings (18) for rotation and stops to adjust their displacement.

5. A process for manufacturing the molded sheets of claim 1, said process comprising following steps:
   i) Cutting the sheets with water jet or laser according to each type of bone and fracture;
   ii) Creating cavities in the sheet with water jet or laser cutting;
   iii) Preforming the sheets with rollers having surfaces engraved with veins, channels, and contact micro points, wherein the sheets created are curved with said veins, channels, and contact micro points according to each type of bone and fracture;
   iv) Creating horizontal and vertical folds to join two or more sheets;
   v) Molding a blade for osteosynthesis by pressing a preformed blade on the fractured bone prototype using hydraulic or mechanical pressure wheels located along and around the fractured bone prototype; wherein the wheels have same shape of veins, and channels as a shape of the preformed sheet so that the pressure wheels move around the preformed sheet and imprint the contour and undulations of the bone to create a mold of the fractured bone prototype or of the patient's bone;
   vi) Forming clamp by cutting sheets with water jet or laser according to each type of bone and fracture;
   vii) Creating cavities in the sheet that forms the clamp with water jet or laser cutting;
   corresponding with a shape and size of the sheet and tool of step (i);
   viii) Creating a clamp closure with a flat sheet (15) with folds configured to receive an end of the clamp;
   ix) Molding clamps on the channels and contour of the mold using the rollers of step (iii);
   x) Creating the prototype of the fractured bone by imaging and 3D printing the fractured bone to be repaired;
   xi) Generating a 3D impression corresponding to how separated bone parts should look; and
   xii) pre-adjusting the osteosynthesis and the clamps to 3d bone model.

6. The process of claim 5, wherein the cavities in step (ii) are created simultaneously with the cutting of the sheets of step (i).

7. The process of claim 5, wherein the cavities in step (vii) are created simultaneously with the cutting of the sheets of step (vi).

* * * * *